United States Patent [19]

Christopherson

[11] 4,030,277

[45] June 21, 1977

[54] MOWER REAR SHIELD STRUCTURE

[75] Inventor: Herman P. Christopherson, Burnsville, Minn.

[73] Assignee: The Toro Company, Minneapolis, Minn.

[22] Filed: July 3, 1974

[21] Appl. No.: 485,379

[52] U.S. Cl. .............................................. 56/320.1
[51] Int. Cl.² ......................................... A01D 75/20
[58] Field of Search ............ 56/17.4, 320.1, 320.2, 56/255

[56] References Cited
UNITED STATES PATENTS

| | | |
|---|---|---|
| 3,190,061 | 6/1965 | Gilbertson .......................... 56/17.4 |
| 3,306,015 | 2/1967 | Myers ................................. 56/17.4 |
| 3,378,995 | 4/1968 | Welsh ............................... 56/320.1 |
| 3,432,183 | 3/1969 | Groll ................................. 56/17.4 |
| 3,727,386 | 4/1973 | Jesperson et al. ................. 56/17.4 |
| 3,797,213 | 3/1974 | Sadow, Jr. et al. ................ 56/17.4 |

Primary Examiner—J.N. Eskovitz
Attorney, Agent, or Firm—Merchant, Gould, Smith, Edell, Welter & Schmidt

[57] ABSTRACT

A rear shield for rotary lawn mowers comprising a body made of strips of rigid and flexible plastic secured together longitudinally in edge to edge relation. Means are provided for suspending the body at the rear of the mower with a rigid portion gravitationally contacting the surface being mowed.

10 Claims, 7 Drawing Figures

U.S. Patent  June 21, 1977  4,030,277
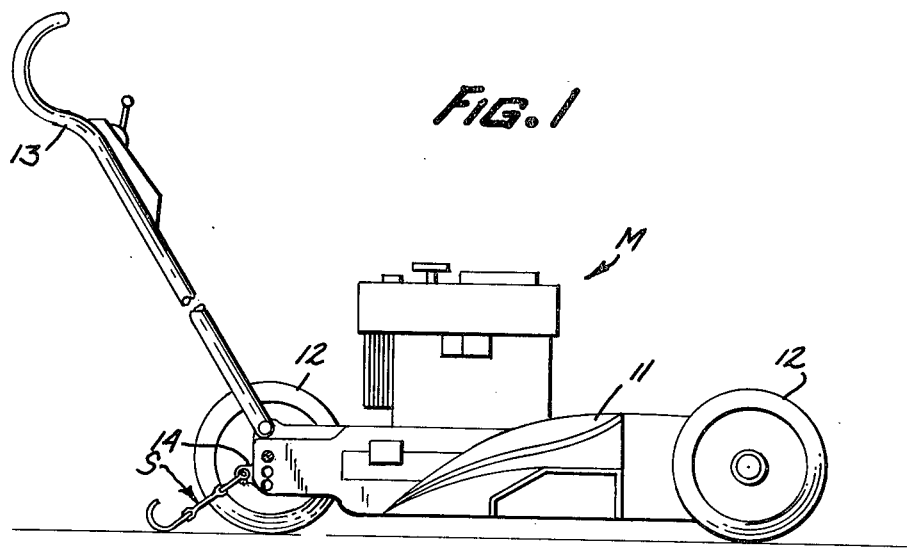
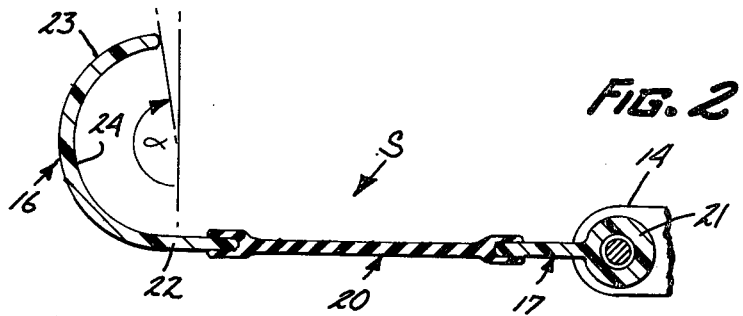
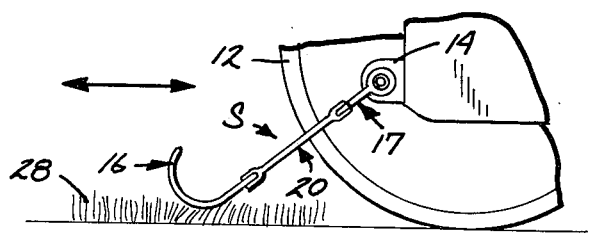
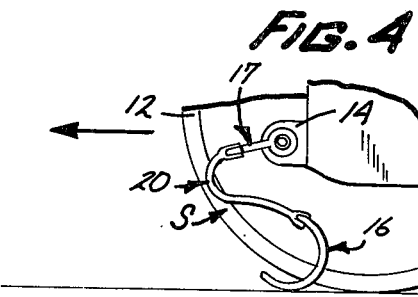
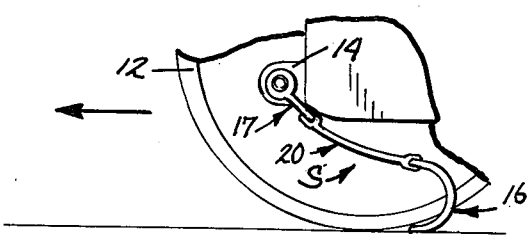
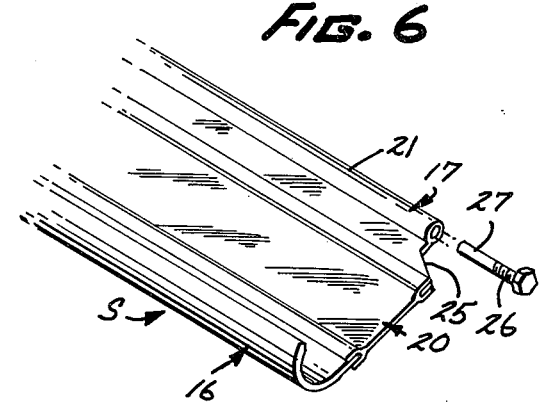
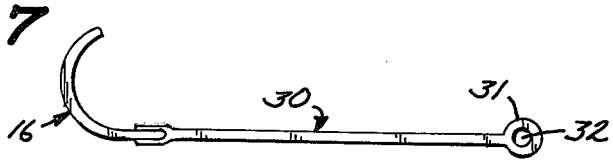

MOWER REAR SHIELD STRUCTURE

BACKGROUND OF THE INVENTION

Rotary lawn mowers, meaning those with a cutter rotating at high speed about a vertical axis within a housing, are presently very popular. They sometimes propel loose objects rearwardly against the legs of the user, however, and they are capable of injuring his toes if he allows his foot to enter the path of the whirling blade.

It has accordingly been the custom to provide some sort of rear shield of the back of such mowers to protect the user against these happenings. Shields of many degrees of complexity have been proposed, but it has been uniformly found that the shields so interfere with convenient use of the mowers, particularly in backward cuts, that the users remove them, preferring to work "carefully" with an unshielded machine rather than to work safely with a mower of reduced maneuverability.

SUMMARY OF THE INVENTION

The present invention comprises a rear shield which is so designed and constructed as to present negligible reduction in maneuverability of the mower, while providing maximum protection to the use, regardless of the direction of the cut. This is accomplished by pivotally suspending the shield to gravitationally engage the ground, and constructing it of parallel portions of greater and less regidity, a more rigid portion contacting the ground. During the forward movement of the mower, the shield simply trails behind it. During backward movement the shield flexes reversely on itself, to extend forward under the mower and still remain in contact with the ground. This all occurs automatically, with almost no effect on the maneuverability of the machine. The likelihood of the users injudiciously removing the shield is thus greatly reduced.

It is accordingly a principal object of the invention to provide a mowing arrangement having increased safety for the user. Another object of the invention is to provide a mowing arrangement with a rear shield that performs its function without materially decreasing the maneuverability of the mower. Another object is to provide a mower shield that automatically moves between a trailing position, when the mower is propelled forward, and a reversed position under the mower, when the latter is propelled backward, the bottom edge of the shield always remaining in contact with the ground. A more specific object of the invention is to provide a mower shield having a relatively rigid bottom portion which is unitary with a flexible portion above it, to permit the shield to fold on itself upon backward movement of the mower to which the shield is attached.

Various other objects, advantages, and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

Turning now to the drawing,

FIG. 1 is an elevational view of one embodiment of the new shield, shown attached to a conventionalized mower, with parts broken away for clarity;

FIG. 2 is a transverse section of a shield according to the invention on a larger scale;

FIGS. 3-5 are detailed, somewhat enlarged views showing the shield in use with a mower moving forward and backward;

FIG. 6 shows a mounting detail; and

FIG. 7 is a view like FIG. 2 of a second modification of the shield on a different scale.

DESCRIPTION OF THE PREFERRED EMBODIMENTS

Turning now to the drawing, reference character M in FIG. 1 designates a lawn mower of the rotary or vertical axis type. It includes a housing 11 carried on wheels 12 and propelled or guided by a handle 13. Housing 11 is provided with means 14 such as a pair of ears projecting backwardly for supporting a rear shield S, which may be as shown in FIG. 2.

Shield S comprises a body having first and second thin strips 16 and 17 of rigid vinyl plastic, joined in longitudinal edge to edge fashion to a thin strip 20 of flexible vinyl plastic. By way of illustration, strips 16 and 17 having a durometer hardness of approximately 78 on the Shore "D" scale, and a strip 20 having a hardness of approximately 81 on the Shore "A" scale, were found to be satisfactory, but considerable variation from these values may be tolerated. Strip 17 is shown to have a tubular enlargement 21 extending along its outer or upper edge, and acts as a means for supporting the body.

Strip 16 has an outer or lower portion defining a curved surface approximating a right circular cylinder, the curve extending through approximately 180° of curvature, as indicated at $\alpha$, from a narrow flat inner portion 22 into which it merges. Reference will later be made to the convex surface 23 and the concavity 24 of this member.

Shield S may conveniently be made by extruding the three strips separately and pressing them together in intimate contact before curing: the curing process then results in a unitary length of material which may be cut to dimensions appropriate to the mowers with which the shields are to be used. As shown in FIG. 6, corners of strip 17 may be cut away at 25 if desired. Means such as a screw 26 having an unthreaded end portion 27 of reduced diameter are provided to pass inwardly through ears 14 and be received in the opening in tubular enlargement 21, thus pivotally suspending the shield from the back of the mower.

Shield S is shown in FIG. 3 in the position which it assumes when the mower is being propelled forward, as is also shown in FIG. 1. Convex surface 23 of strip 16 is in gravitational contact with the material 28 being mowed, and concavity 24 is upturned. In this position the shield is in the path of any bodies thrown rearwardly by contact with the spinning blade, and is also between the user's toe and the space through which the blade spins.

When the mower is propelled backward, shield S goes through the movements shown in FIG. 4 to reach the position shown in FIG. 5. This action takes place automatically, by friction of convex surface 23 with the grass, and particularly if some object such as a root or a clump of tall grass is contacted. The flexible material of strip 20 is capable of bending sharply and even reversely, as the instantaneous applied forces call for, and no appreciable interference of the maneuverability of the mower occurs.

It is not necessary that shield S be made of three plastic strips. As shown in FIG. 7 it is possible to combine the function of strips 20 and 17 in a single strip 30 of flexible plastic with the tubular enlargement 31 formed therein. In such a case the shield may be supported by a rod 32 passing through the full length of strip 30 and through ears 14 of the mower, being secured by suitable fastenings at each end. Although the exact details of the bending in the two flexible members may differ slightly, the general operation of this embodiment of the invention is the same as described above.

In either modification of the invention it is evident that the exact angle made by the shield with the ground plane will vary if the height of the cut is adjusted, but this does not affect the operation of the arrangement in any way.

The shield has been shown as being made of two different materials, but the principal of the invention can also be embodied using a single relatively flexible material if its lower edges reinforce, enlarge, or otherwise constructed to have a relatively rigid characteristic. While the particular cross section shown is considered preferable, the flexing action may be expected to occur with shields of other sections, as long as a rigid portion in contact with the ground is topped by a flexible portion above it.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appendee claims are expressed.

What is claimed is:

1. A rear shield for a power mower comprising, in combination:
   a strip of flexible material;
   means extending along one edge of the strip for supporting it behind a mower;
   and means including a downwardly convex rigid strip of substantially hemi-cylindrical cross section extending along the other edge of said strip for rendering said edge substantially less flexible;
   the total width of said strip and the first and second named means being such that when the shield is mounted on the mower the last named means is in contact with the surface being mowed.

2. As an article of manufacture:
   an elongated body of generally J-shaped cross section comprising inner and outer plastic strips joined in edgewise relation to comprise a unitary member, said outer strips being rigid and said inner strip being flexible, one of said outer strips having an outer portion defining a circular cylindrical surface extending through substantially 180° of curvature from a narrow flat inner portion tangent thereto, and one of said outer strips including a tubular enlargement extending along the outer edge thereof.

3. The structure of claim 2 in which said strips are of vinyl plastic.

4. The structure of claim 3 in which the hardness of the outer strips is about 78 on the Shore D scale.

5. The structure of claim 3 in which the hardness of the inner strip is about 81 on the Shore A scale.

6. As an article of manufacture:
   an elongated body of generally J-shaped cross section comprising inner and outer strips joined in edgewise relation to comprise a unitary member, said outer strips being substantially rigid and said inner strip being flexible, one of said outer strips having an outer portion defining a curved surface extending through substantially 180° of curvature from a narrow flat inner portion merging therewith, and one of said outer strips including a tubular enlargement extending along the outer edge thereof.

7. A rear shield for a power mower comprising, in combination:
   an elongated body of generally J-shaped cross section comprising inner and outer strips joined in edgewise relation to comprise a unitary member, said outer strips being rigid and said inner strip being flexible, one of said outer strips having an outer portion defining a circular cylindrical surface extending through substantially 180 degrees of curvature from a narrow flat inner portion tangent thereto, and one of said outer strips including a tubular enlargement extending along the outer edge thereof;
   and means in the ends of said tubular enlargement for supporting said body to pivot about a longitudinal axis.

8. A rear shield for rotary lawn mower comprising, in combination:
   a thin elongated body of generally J-shaped cross section comprising a rigid strip and a flexible strip joined in longitudinal edge to edge relation to comprise a unitary member, said rigid strip having a lower portion defining a curved surface extending through substantially 180° of curvature from a narrow flat inner portion merging therewith;
   and means at the upper edge of said flexible strip for supporting the body.

9. In combination, a rotary mower including a housing;
   a rear shield comprising an elongated body of generally J-shaped cross section comprising inner and outer strips joined in edgewise relation to comprise a unitary member, said outer strips being rigid and said inner strip being flexible, one of said outer strips having an outer portion defining a circular cylindrical surface extending through substantially 180° of curvature from a narrow flat inner portion tangent thereto, and one of said outer strips including a tubular enlargement extending along the outer edge thereof;
   means in the ends of said tubular enlargement for supporting said body to pivot about a longitudinal axis;
   and means at the rear of said housing for pivotally suspending the body with the convex face of said curved surface in gravitational contact with the ground, and with the concavity thereof upturned.

10. A flexible guard for protecting the pedal extremities of an operator of a rotary mower having a wheel supported frame with at least one blade rotor operable within said frame, said guard being supported by said frame and comprising:

a. a dependent flexible strip member formed of elastomeric material extending from one end of said frame including means for securing same to said frame;

b. said strip member having a varying durometer measured transversely thereof, and including:

i. a relatively rigid upper portion of relatively high durometer;

i. a relatively flexible intermediate portion of relatively low durometer adapted to yield in accordance with the direction of movement of said mower and the position of said mower with respect to a ground;

iii. a relatively rigid lower portion of relatively high durometer adapted to engage the ground.

* * * * *